(12) United States Patent
Chen et al.

(10) Patent No.: US 6,623,679 B2
(45) Date of Patent: Sep. 23, 2003

(54) METHOD OF CONTROLLING WIDTH OF POLYESTER FILM SUPPORT

(75) Inventors: Wen-Li A. Chen, Rochester, NY (US); Timothy F. Cilano, Pittsford, NY (US); Larry K. Maier, Rochester, NY (US); Jeffrey P. Johnson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 124 days.

(21) Appl. No.: 09/751,117

(22) Filed: Dec. 29, 2000

(65) Prior Publication Data

US 2002/0121727 A1 Sep. 5, 2002

(51) Int. Cl.$^7$ .............................................. B29C 47/92
(52) U.S. Cl. .............................. 264/171.1; 264/173.15; 264/235.8
(58) Field of Search .................. 264/173.15, 171.1, 264/235.8, 40.7, 40.1; 26/72, 89, 90

(56) References Cited

U.S. PATENT DOCUMENTS

| | | | | |
|---|---|---|---|---|
| 2,978,740 A | * | 4/1961 | Maier | 26/90 |
| 3,432,894 A | * | 3/1969 | Sass et al. | 26/52 |
| 3,833,973 A | * | 9/1974 | Schwarz | 26/73 |
| 4,050,124 A | * | 9/1977 | Barnsbee | 26/73 |
| 4,384,392 A | * | 5/1983 | Allen | 26/72 |
| 5,259,097 A | * | 11/1993 | Aihara et al. | 26/92 |
| 5,759,756 A | | 6/1998 | Laney et al. | |
| 5,819,382 A | * | 10/1998 | Greif et al. | 26/90 |
| 5,824,394 A | | 10/1998 | Kinoshita et al. | |

FOREIGN PATENT DOCUMENTS

| | | |
|---|---|---|
| DE | 39 08 690 A1 | 11/1989 |
| EP | 1 038 653 A2 | 9/2000 |

* cited by examiner

*Primary Examiner*—Mark Eashoo
(74) *Attorney, Agent, or Firm*—Doreen M. Wells

(57) ABSTRACT

A method for controlling the width of a polyester film support comprising, in order, the steps of: (a) extruding a polyester resin using one or more extruders; (b) casting the resin on a casting wheel to form a polyester sheet; (c) stretching the polyester sheet along the machine direction by ratios of 3 to 5 times at temperatures ranging from above the glass transition temperature to below the thermal crystallization temperature, wherein the machine contains extended edge rollers (14) in the drafter at the point where stretching occurs; (d) stretching the polyester sheet along the transverse direction by ratios of 3 to 5 times at temperatures ranging from above the glass transition temperature to below the thermal crystallization temperature; and (e) heat setting the polyester sheet at temperatures ranging from 180 to 250° C.

8 Claims, 2 Drawing Sheets

METHOD OF CONTROLLING WIDTH OF POLYESTER FILM SUPPORT

FIELD OF THE INVENTION

The present invention relates in general to the manufacture of imaging films and elements and in particular to a novel method of controlling necking-in of a polyester film during machine direction stretching in a biaxial orientation process.

BACKGROUND OF THE INVENTION

The conventional processes to manufacture polyester photographic film supports typically involve biaxially orienting a cast amorphous sheet. Such orientation processes and subsequent heat setting significantly improves the flexibility, tensile strength, dimensional stability, etc. of materials such as Polyethylene Terephthalate (PET) and Polyethylene Naphthalate (PEN) and thus renders them usable as photographic film supports.

It is well known to those skilled in this field that it is necessary to stretch the cast sheet in both the longitudinal or machine direction (MD) and the transverse or width direction (TD) beyond its strain hardening point to produce films with uniform thickness and useful properties. A polyester machine is thus often designed to provide enough stretching latitude to accomplish this.

However, it would be difficult, if not impossible, to use an existing machine that was designed to manufacture PET supports, for example, to manufacture film supports using materials such as PEN without significant modification of the machine. This is primarily due to the fact that PEN has a much higher strain hardening point than that of PET and therefore requires higher stretching ratios. The existing width of the casting wheel, extrusion die, machine direction orientation equipment and the tenter frame dictate the stretch ratios achievable on each machine. If the maximum ratios achievable on the existing film machine are lower than the ratios required to pass the strain hardening points, one would have to rebuild the machine. For example, even increasing just the final tenter width would be a problem as films would have to have excessive edge trims to make film rolls with the same width as was made before the increase. One alternative would be to change the casting wheel, die, machine direction orientation equipment, but this would be expensive and in any case, there would be difficulty maintaining flexibility on the film line to manufacture PET as well as PEN films.

Another alternative would be to slit some portion of the MD stretched sheet before entering the TD stretch. However, this would incur excess edge-trim waste and cause robustness issues caused by slitting a film while it is still mostly amorphous and much thicker than the final film thickness for photographic film supports. These are both undesirable alternatives.

It would be desirable to have a process or a machine that is able to control the width of different types of polyester (e.g., PET and PEN) film supports during the machine direction orientation process step.

SUMMARY OF THE INVENTION

The present invention discloses a process to manufacture biaxially oriented imaging polyester film supports by allowing the edges to "neck in" during the longitudinal or machine direction stretch in a controlled manner to minimize edging waste and to minimize edge effects. As used herein, the term "neck-in" means reduction in width of a cast sheet when conducting machine direction (MD) orientation.

To solve the problem outlined above, the present invention takes advantage of the natural neck-in tendency of a thermoplastic material upon stretching in the machine direction. That is, with use of the present invention, the width of a MD stretched sheet is reduced in a controlled manner by a desired amount such that no edge trim is necessary. The present invention thus addresses the needs related to a MD orientation process where the film width leaving the process can be controlled to eliminate edge trimming after MD orientation, reduce or eliminate edge orientation effects, avoid large capital expenditures to the film line while maintaining the ability to manufacture different types of polyester film supports, such as PET and PEN, alternatively on the same film line.

Hence, the present invention discloses:
a method for controlling the width of a polyester film support comprising, in order, the steps of:

(a) extruding a polyester resin using one or more extruders;

(b) casting the resin on a casting wheel to form a polyester sheet;

(c) stretching the polyester sheet along the machine direction by ratios of 3 to 5 times at temperatures ranging from above the glass transition temperature to below the thermal crystallization temperature, wherein the machine contains extended edge rollers (14) in the drafter at the point where stretching occurs;

(d) stretching the polyester sheet along the transverse direction by ratios of 3 to 5 times at temperatures ranging from above the glass transition temperature to below the thermal crystallization temperature; and (e) heat setting the polyester sheet at temperatures ranging from 180 to 250° C.

Also disclosed is a beaded drafter modified by having extended rollers (14) installed to narrow the width of a polyester sheet during the machine stretch as it passes along the drafter.

BRIEF DESCRIPTION OF THE DRAWINGS

FIG. 2 is a top view and edge view of a beaded drafter process.

DETAILED DESCRIPTION OF THE INVENTION

Figure 1:
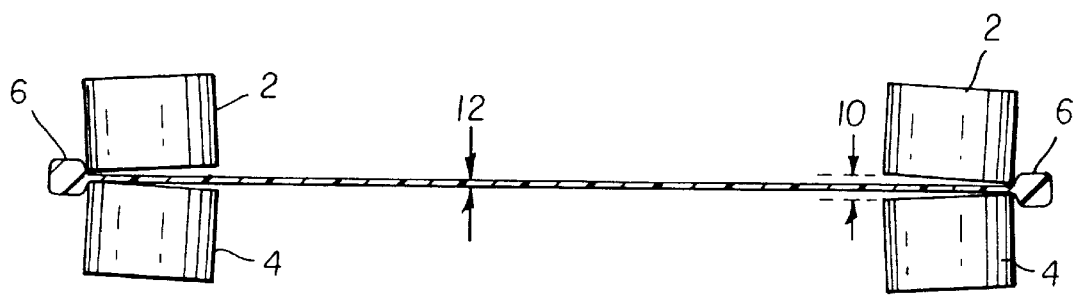
FIG. 1 shows a cross-sectional view of a beaded cast sheet constrained by a pair of bearing rollers on each side of the edge.

The present invention involves modifying the machine direction stretching of a conventional sequential stretching machine using a beaded drafter. Specifically, this invention addresses the needs to make PEN film on an existing PET biaxial stretching machine that has limited tenter width. The machine of the invention is modified to accommodate the high stretch ratio required for making PEN film. PEN is described in U.S. Pat. No. 5,759,756 which is incorporated herein in its entirety.

The present invention requires a hardware modification of a beaded drafter section (18). A pair of extended edge rollers (14) were installed in the drafter at the point where stretching occurs (16). As used herein, the term "extended roller (s)" means rollers that have been mounted on an extension bar which move the rollers position inward by a predetermined neck-in amount. Each pair consists of top (2) and bottom rollers (4) that hinge the edge bead (6) from further necking in once it hits the rollers. The gap between the top and bottom rollers (10) can be mechanically adjusted for different cast sheet thicknesses (12).

The amount of neck-in is determined by the distance between the existing edge rollers and the extended rollers (14). This can be altered by having a number of sets of extended roller blocks that can be easily mounted on the drafter section. The amount of neck-in also depends on the polymer being processed since different polyesters require different stretch ratios.

Conventionally, PET film can be made at a stretch ratio between 3 to 4×. However, to make PEN film, the stretch ratio is preferably set higher than 4× due to its higher strain hardening point, mentioned in U.S. Pat. No. 5,759,756.

EXAMPLES

Figure 2A:
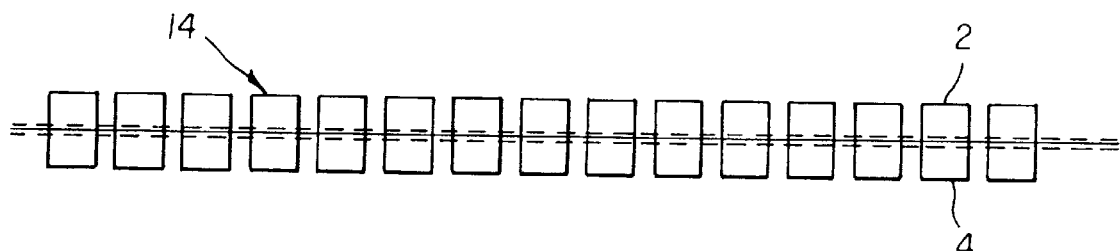
FIG. 2a is a section view looking from the web side.
Figure 2B:
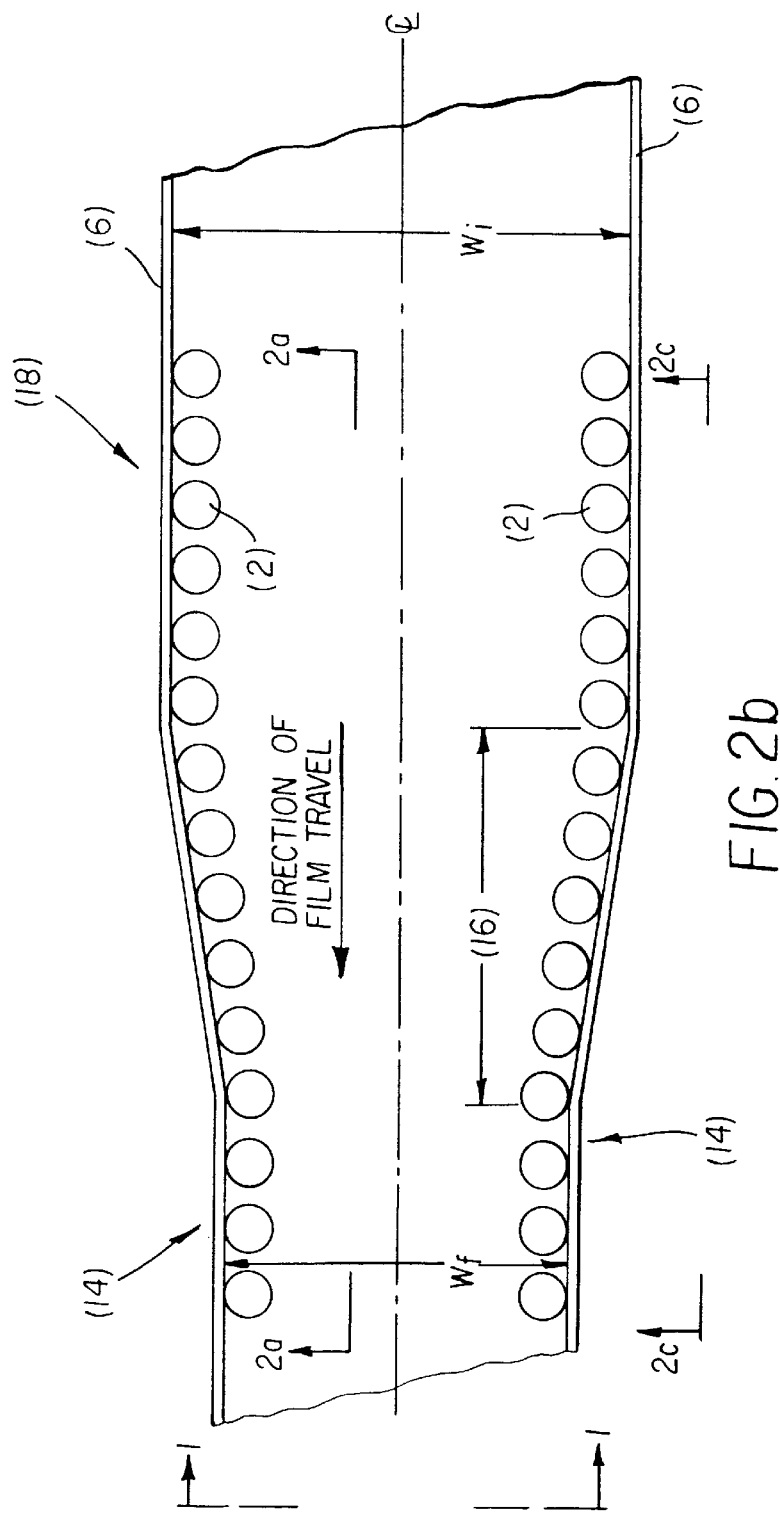
FIG. 2b is a top view of the bead drafter.
Figure 2C:
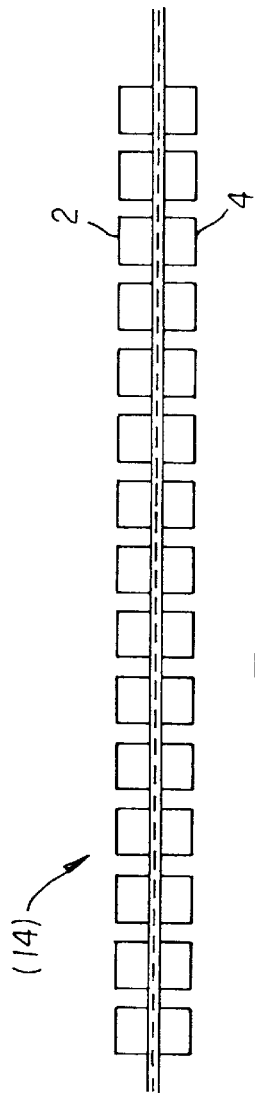
FIG. 2c is a section view looking from the bead side.

Experiments were conducted to make photographic polyester film supports with the drafter configuration modified as in FIGS. 1 and 2. The amount of neck-in was set at 15%, which was determined by (Wi−Wf)/Wi×100%. A 15% edge trim on each side of a drafted, or machine direction oriented, sheet is slit off prior to tentering. This provides a direct comparison (that is, same width entering the tenter) with current invention. One incurs in the prior art about 15% edge trim waste. PEN resin was dried and extruded from an extruder. The cast sheet was biaxially stretched in both the machine and transverse directions to various ratios described in Table 1. The machine direction stretch was done at 150° C. and the transverse direction stretch was done at 145° C. The film was then heatset at 240° C. A PEN comparison sample was produced in the same manner except without the extended rollers set up in the drafter, that is, without using the present invention.

Samples were collected at each process condition for testing. Five lengthwise and five widthwide strips 150 mm×15 mm were cut from each of the films as described above. A Sintech tensile tester (available from Sintech Inc. 378 Page St., Stoughton, Mass. 02072) was used to measure representative tensile properties in accordance with ASTM D882. The properties measured (and the units in which they are reported in Table 1) are: tensile modulus (psi), yield stress (ksi) and break stress (ksi).

Five lengthwise and five widthwide strips 75 mm×25 mm were cut from each of the film bases prepared above and tested in accordance with ASTM D1938. Tear strength is reported as the force (g) needed to propagate the tear.

TABLE 1

Physical Properties of PEN Support

| | MD Ratio | TD Ratio | MD Modulus | TD Modulus (× 10−5 psi) | MD Tear, g (normalized to 3.45 mils) | TD Tear, g (normalized to 3.45 mils) |
|---|---|---|---|---|---|---|
| Comp. Ex. 1 | 3.95 | 4.0 | 9.3 | 9.6 | 42 | 30 |
| Example 1 | 3.75 | 4.0 | 10.1 | 8.9 | 61 | 27 |
| Example 2 | 3.75 | 4.0 | 9.9 | 8.8 | 38 | 47 |
| Example 3 | 3.95 | 4.2 | 9.7 | 9.1 | 26 | 41 |
| Example 4 | 3.95 | 4.2 | 10.1 | 9.5 | 27 | 39 |
| Example 5 | 3.95 | 4.0 | 10.2 | 9.1 | 27 | 42 |

TABLE 1-continued

Physical Properties of PEN Support

| | MD Ratio | TD Ratio | MD Modulus | TD Modulus (× 10−5 psi) | MD Tear, g (normalized to 3.45 mils) | TD Tear, g (normalized to 3.45 mils) |
|---|---|---|---|---|---|---|
| Example 6 | 3.95 | 4.0 | 10.0 | 8.8 | 26 | 50 |
| Example 7 | 3.75 | 4.2 | 9.5 | 9.1 | 32 | 44 |
| Example 8 | 3.75 | 4.2 | 9.4 | 9.3 | 28 | 43 |

MD and TD Ratio = Machine and Transverse Direction Stretch Ratio
Tear Strength is normalized to 3.45 mils to compare samples made at different conditions

TABLE 2

Physical Properties of PEN Support

| | MD Ratio | TD Ratio | MD Modulus | TD Modulus (× 10−5 psi) | MD Tear, g (normalized to 3.45 mils) | TD Tear, g (normalized to 3.45 mils) |
|---|---|---|---|---|---|---|
| Comp. Ex. 1 | 3.95 | 4.0 | 9.3 | 9.6 | 42 | 30 |
| Example 9 | 3.55 | 4.0 | 10.5 | 10.0 | 35 | 47 |
| Example 10 | 3.55 | 4.1 | 10.5 | 9.9 | 36 | 45 |
| Example 11 | 3.55 | 4.2 | 10.2 | 10.0 | 40 | 44 |
| Example 12 | 3.75 | 4.1 | 10.7 | 9.6 | 2734 | 53 |
| Example 13 | 3.75 | 4.2 | 10.7 | 10.0 | 35 | 48 |
| Example 14 | 3.95 | 4.1 | 10.7 | 9.9 | 31 | 51 |
| Example 15 | 3.95 | 4.2 | 11.0 | 9.7 | 32 | 49 |

In manufacturing polyester films, the primary properties of concern and are as shown in Table 1—tensile modulus and tear strength—although other physical properties such as break stress, yield stress, and break elongation are also recorded.

As shown in Table 1, average tensile modulus and tear strength in both machine direction and transverse direction are both comparable to those of the comparative example. For photographic film support application, film with tensile modulus greater than 900,000 psi and tear strength greater than 30 grams has been tested satisfactorily in the Advanced Photo System.

Examples 1 to 7 demonstrate that width reduction or width control can be achieved at various machine direction stretch ratios without sacrificing the physical properties of the film produced. By controlling the width of the film, as disclosed herein, there is less loss to edging waste.

What is claimed is:

1. A method for controlling the width of a polyester film support comprising, in order, the steps of:

(a) extruding a polyester resin using one or more extruders;

(b) casting the resin on a casting wheel to form a polyester sheet;

(c) stretching the polyester sheet along the machine direction by ratios of 3 to 5 times at temperatures ranging from above the glass transition temperature to below the thermal crystallization temperature, wherein the machine contains extended edge rollers (14) installed in the drafter at the point where stretching occurs for the purpose of narrowing the width of the polyester sheet during the machine stretch as it passes along the drafter;

(d) stretching the polyester sheet along the transverse direction by ratios of 3 to 5 times at temperatures ranging from above the glass transition temperature to below the thermal crystallization temperature; and (e) heat setting the polyester sheet at temperatures ranging from 180 to 250° C.

2. The method of claim 1 wherein the thickness of the polyester film support is between 50 to 180 μm.

3. The method of claim 1 wherein the polyester film support comprises polyethylene terephthalate (PET).

4. The method of claim 1 wherein the polyester film support comprises polyethylene naphthalate (PEN).

5. The method of claim 1 wherein the polyester sheet formed is a co-extruded laminate.

6. The method of claim 1 wherein the width of the incoming polyester sheet is narrowed by 5–50 percent during the stretching process on the beaded drafter.

7. The method of claim 1 wherein the width of the incoming polyester sheet is narrowed by 5–30 percent during the stretching process on the beaded drafter.

8. The method of claim 1 wherein the width of the incoming polyester sheet is narrowed by 10–25 percent during the stretching process on the beaded drafter.

* * * * *